United States Patent
Seth et al.

(10) Patent No.: US 11,765,257 B1
(45) Date of Patent: Sep. 19, 2023

(54) SOCKET REPLICATION BETWEEN NODES OF A NETWORK DEVICE WITHOUT OPERATING SYSTEM KERNEL MODIFICATION

(71) Applicant: Juniper Networks, Inc., Sunnyvale, CA (US)

(72) Inventors: Sameer Seth, Bangalore (IN); Abhishek Sudhakar Mudumbi, Bangalore (IN); Murali Mohan Krishnamurthy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 1,187 days.

(21) Appl. No.: 15/806,625

(22) Filed: Nov. 8, 2017

(51) Int. Cl.
*H04L 69/40* (2022.01)
*H04L 41/0668* (2022.01)
*H04L 45/00* (2022.01)
*H04L 43/10* (2022.01)
*H04L 49/901* (2022.01)

(52) U.S. Cl.
CPC ............ *H04L 69/40* (2013.01); *H04L 41/0668* (2013.01); *H04L 45/22* (2013.01); *H04L 43/10* (2013.01); *H04L 49/901* (2013.01)

(58) Field of Classification Search
CPC .......... G01R 31/08; G06F 13/00; H04L 12/24; H04L 12/2602; H04L 29/06; H04L 29/14; H04L 29/08072; H04L 41/22; H04L 41/0668; H04L 43/00; H04L 45/00; H04L 45/28; H04L 45/58; H04L 45/60; H04L 49/552; H04L 69/16; H04L 69/40; H04L 69/163; H04L 2012/5627; G06F 3/00; G06F 7/00; G06F 9/44; G06F 9/46; G06F 9/52; G06F 9/461; G06F 9/462; G06F 9/466; G06F 9/481; G06F 9/485; G06F 9/526; G06F 9/545; G06F 9/3851; G06F 9/4843; G06F 9/4881; G06F 9/4887; G06F 9/5027; G06F 12/00; G06F 21/57; H04L 12/66; H04L 29/06068; H04L 45/02; H04L 45/54; H04L 49/351; H04J 3/14
USPC ... 370/219; 709/224, 249; 718/100, 107, 108
See application file for complete search history.

(56) References Cited

U.S. PATENT DOCUMENTS

| | | | |
|---|---|---|---|
| 6,665,293 | B2 | 12/2003 | Thornton et al. |
| 6,853,617 | B2 | 2/2005 | Watson et al. |
| 7,236,453 | B2 | 6/2007 | Visser et al. |
| 7,269,133 | B2 | 9/2007 | Lu et al. |
| 7,274,706 | B1 | 9/2007 | Nguyen et al. |
| 7,292,535 | B2 | 11/2007 | Folkes et al. |
| 7,417,947 | B1 | 8/2008 | Marques et al. |
| 7,940,650 | B1 | 5/2011 | Sandhir et al. |

(Continued)

*Primary Examiner* — Douglas B Blair
(74) *Attorney, Agent, or Firm* — Shumaker & Sieffert, P.A.

(57) ABSTRACT

An example network device includes a primary node and a standby node. The primary node includes one or more processors implemented in circuitry and configured to execute an operating system providing an application space and a kernel space, execute a replication application in the application space to receive a write function call including data to be written to a socket of the operating system and to send a representation of the data to a replication driver executed in the kernel space, execute the replication driver to send the representation of the data to a replication module executed in the kernel space, and execute the replication module to send the representation of the data to the standby node and, after receiving an acknowledgement from the standby node, to send the data to the socket.

23 Claims, 6 Drawing Sheets

(56) References Cited

U.S. PATENT DOCUMENTS

| | | |
|---|---|---|
| 8,050,559 B2 | 11/2011 | Sindhu |
| 9,077,617 B1* | 7/2015 | Seth et al. ......... H04L 41/0668 |
| 9,491,107 B1 | 11/2016 | Scudder et al. |
| 11,115,262 B2* | 9/2021 | Dubey et al. ...... H04L 41/0663 |
| 2003/0210694 A1 | 11/2003 | Jayaraman et al. |
| 2008/0044181 A1 | 2/2008 | Sindhu |
| 2008/0072236 A1* | 3/2008 | Pope et al. ............. H04L 45/00 |
| | | 718/108 |
| 2008/0088408 A1 | 4/2008 | Backman |

* cited by examiner

SOCKET REPLICATION BETWEEN NODES OF A NETWORK DEVICE WITHOUT OPERATING SYSTEM KERNEL MODIFICATION

TECHNICAL FIELD

This disclosure relates to computer networks and, more particularly, to network devices, such as routers, that perform a switchover from a primary control unit to a secondary control unit.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain routing information that describes routes through the network. Each route defines a path between two locations on the network. From the routing information, the routers may generate forwarding information, which is used by the routers to relay packet flows through the network and, more particularly to relay the packet flows to a next hop. In reference to forwarding a packet, the "next hop" from a network router typically refers to a neighboring device along a given route. Upon receiving an incoming packet, the router examines information within the packet to identify the destination for the packet. Based on the destination, the router forwards the packet in accordance with the forwarding information.

Large computer networks, such as the Internet, often include many routers that exchange routing information according to a defined routing protocol, such as the Border Gateway Protocol (BGP). When two routers initially connect, the routers exchange routing information and generate forwarding information from the exchanged routing information. Particularly, the two routers initiate a routing communication "session" by which they exchange routing information according to the defined routing protocol. The routers continue to communicate via the routing protocol to incrementally update the routing information and, in turn, update their forwarding information in accordance with changes to a topology of the network indicated in the updated routing information. For example, the routers may send update messages to advertise newly available routes or routes that are no longer available.

In the event one of the routers of a routing communication session detects a failure of the session, i.e., the session "goes down," the surviving router may select one or more alternative routes through the network to avoid the failed router and continue forwarding packet flows. In particular, the surviving router may update internal routing information to reflect the failure, perform route resolution based on the updated routing information to select one or more alternative routes, update its forwarding information based on the selected routes, and send one or more update messages to inform peer routers of the routes that are no longer available. In turn, the receiving routers update their routing and forwarding information, and send update messages to their peers. This process continues and the update information propagates outward until it reaches all of the routers within the network. Routing information in large networks may take a long period of time to converge to a stable state after a network fault due to temporary oscillations, i.e., changes that occur within the routing information until it converges to reflect the current network topology. These oscillations within the routing information are often referred to as "flaps," and can cause significant problems, including intermittent loss of network connectivity and increased packet loss and latency.

To reduce the impact of failures, some routers include a primary routing control unit and a secondary routing control unit. In the event the primary routing control unit fails, for example, the secondary routing control unit assumes the responsibility of forwarding packet flows. During a switchover from the primary routing control unit to the secondary routing control unit, a significant period of time may elapse before the secondary routing control unit reaches a state in which it is able to process and forward packets. For example, the secondary routing control unit may need to reestablish routing communication sessions, e.g., BGP sessions, that were lost when the primary routing control unit failed. During this period, network traffic may be queued or lost.

To prevent loss of data, primary and backup routing control units perform socket data replication. Such socket data replication is an important requirement for high-availability of L4 (Transport Layer) connections to handle failovers from the primary to the backup. Although socket data replication has been performed in user/kernel space, such an implementation not only involves the overhead of system calls, but also the additional overhead of copying data from kernel- to user-space to replicate the socket data. Such memory copy operations are computationally expensive. Conventional socket data replication techniques rely on modification to the kernel socket layer of an operating system, as well as user space applications, to accommodate data replication functionality. This is because the application needs to be configured to handle its socket as a replicated socket, and the socket layer has to intercept data flowing in either direction to make sure data is being replicated before it is sent to the destination (application) or down the stack for transmission. In order to make this possible, there needs to be heavy modifications in the kernel socket layer as well as the protocol and the application layer.

SUMMARY

In general, this disclosure describes techniques for enabling graceful failover including socket data replication between primary and backup nodes (e.g., control units) of a network device without necessarily relying on kernel-level operations. As such, graceful failover including socket data replication may be enabled without necessarily requiring modification to or upgrade of a kernel of an operating system of a primary node (e.g., a routing engine). This disclosure recognizes that in some instances, modifying the kernel or otherwise relying on kernel-level functionality may be undesirable for at least the following reasons: open source software licensing may prohibit modification of the kernel, periodic upgrades to the kernel may be necessary and socket layer modification may make upgrades more difficult to perform, the kernel may only be available as a binary rather than in open source form, and existing applications may be deployed that should not need modification in order to implement socket data replication.

This disclosure describes techniques for achieving socket data replication without necessarily requiring operating system kernel modification. As one example, a primary device (such as a router) may be configured to include a software (e.g., a replication library) configured to override socket writes to an application. That is, when an application calls a kernel function for writing data to a socket, a replication application of the replication library, executed in application space, receives (e.g., intercepts) the data to be written to the socket instead of having the data pass directly to the socket layer of the kernel. The replication application thereby effectively overrides a conventional socket function of an operating system providing the sockets, and may be viewed as a user-space shim-layer of software between the applications executing on the device and the underlying kernel responsible for managing network connections with peer devices, such as sockets. This replication application repackages the data to be written and provides the repackaged data to a replication driver. The replication driver provides the data to a replication module executed in kernel space, which sends the data to a backup device (such as a backup router), and then writes the data to a socket after receiving an acknowledgement from the backup device that the data has been stored. A similar, albeit reciprocal, process may be performed when data is received by the socket.

In one example, a method includes receiving, by a replication application executed in application space provided by an operating system of a primary node of a network device, a write function call including data to be written to a socket of the operating system, sending, by the replication application, a representation of the data to a replication driver executed in kernel space provided by the operating system, sending, by the replication driver, the representation of the data to a replication module executed in the kernel space, sending, by the replication module, the representation of the data to a standby node of the network device, and after receiving an acknowledgement from the standby node, sending, by the replication module, the data to the socket.

In another example, a network device includes a primary node and a standby node. The primary node includes one or more processors implemented in circuitry and configured to execute an operating system providing an application space and a kernel space, execute a replication application in the application space to receive a write function call including data to be written to a socket of the operating system and to send a representation of the data to a replication driver executed in the kernel space, execute the replication driver to send the representation of the data to a replication module executed in the kernel space, and execute the replication module to send the representation of the data to the standby node and, after receiving an acknowledgement from the standby node, to send the data to the socket.

In another example, a computer-readable storage medium has stored thereon instructions that, when executed, cause one or more processors of a primary node of a network device to execute an operating system to provide an application space and a kernel space, execute a replication application in the application space to receive a write function call including data to be written to a socket of the operating system and to send a representation of the data to a replication driver executed in the kernel space, execute the replication driver to send the representation of the data to a replication module executed in the kernel space, and execute the replication module to send the representation of the data to a standby node of the network device, and, after receiving an acknowledgement from the standby node, to send the data to the socket.

The details of one or more examples are set forth in the accompanying drawings and the description below. Other features, objects, and advantages will be apparent from the description and drawings, and from the claims.

DETAILED DESCRIPTION

Figure 1:
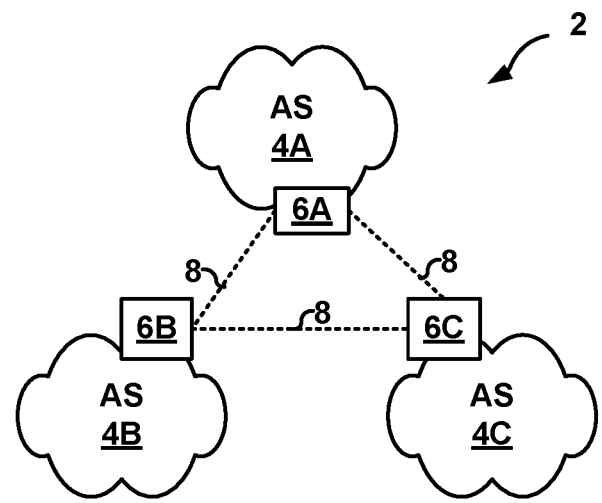
FIG. 1 illustrates an example computing network formed by autonomous systems interconnected by communication links.

FIG. 1 illustrates an example computing network 2 formed by autonomous systems 4A-4C (herein autonomous systems 4) interconnected by communication links 8. Each of autonomous systems 4 represents an independent administrative domain having a variety of networked resources capable of packet-based communication. For example, autonomous systems 4 may include internal networks having servers, workstations, network printers and faxes, gateways, routers, and the like. In this example, autonomous systems 4 include autonomous system border routers (ASBRs) 6 for sharing routing information and forwarding packets via communication links 8. That is, routers 6 maintain peer routing sessions and exchange messages conveying routing information in accordance with a routing protocol, such as the Border Gateway Protocol (BGP). The messages communicated over the routing sessions typically advertise and withdraw routes for reaching destinations within network 2. In the event of a network topology change, such as link failure or failure of one of routers 6, any of the routers detecting the change issue routing messages informing the other routers of the affected routes. In response, routers 6 select new routes for reaching the destinations within network 2.

In order to mitigate the effects on node failure, one or more of routers 6 incorporate a primary routing engine and one or more backup routing engines to assume routing responsibilities in the event the primary routing engine fails. Moreover, as described herein, one or more of routers 6 provide graceful switchover from the primary routing engine to one of the secondary routing engines using replication of routing communication sessions, such as sockets. That is, data for the sockets associated with the routing communication sessions on the primary routing engine is transparently replicated to the secondary routing engine in realtime (i.e., while the primary routing engine exchanges routing messages) prior to any switchover event. The secondary routing engine constructs and maintains communication sockets so as to mimic the sockets currently used by the primary routing engine when communicating with the other routers 6.

During a switchover from the primary routing engine to the secondary routing engine, the pre-established sockets on the secondary routing engine contain all the information needed to ensure that the connections with the routing peers stay up and need not be reestablished. This information typically includes any communication data queued in the socket buffer. As described herein, these techniques may be implemented without requiring changes to networking protocols. In this manner, the techniques provide for peer-agnostic socket replication.

For purposes of example, the techniques of this disclosure are described with reference to router 6A. However, any or all of routers 6B-6C may operate in accordance with the techniques described herein. In this example, router 6A provides non-stop routing by including a primary routing engine as well as one or more standby routing engines (not shown). In the event of a switchover, i.e., when the primary routing engine of router 6A fails or otherwise needs to be shut down, one of the standby routing engines assumes control over routing resources and routing functionality generally. Prior to the switchover, the primary and standby routing engines synchronize their respective state information to allow the standby routing engine to assume control of the router resources without having to relearn state information. Moreover, a corresponding socket is pre-established on the standby routing engine for each socket currently in use by the primary routing engine for routing sessions.

For example, router 6A may engage in a routing session with, e.g., router 6B using a socket. Router 6A and router 6B may exchange routing messages over the socket in accordance with a routing protocol, such as BGP. When router 6A receives a routing message from router 6B, the routing message may be internally forwarded to the primary routing engine of router 6A for processing. Before being fully processed by the primary routing engine and acknowledged, however, the received routing message is replicated and sent to the secondary routing engine of router 6A. Similarly, when router 6A outputs routing messages to router 6B via the socket, the routing message to be sent is replicated and sent to the secondary routing engine.

In response to receiving inbound or outbound routing messages, the secondary routing engine updates state information for its socket corresponding to the socket of the primary routing engine used for the communication session. In particular, the primary routing engine of router 6A may send replicated data to the secondary routing engine before the data is processed by a transport layer for the socket on the primary routing engine. For example, data may be replicated and communicated to the backup routing engine before outbound data is packaged into a packet (when sending data) by the transport layer or before an inbound packet is unpacked from a packet (when receiving data) by the transport layer. As further illustrated below, this asymmetric replication of data for routing messages at different levels of the networking stack aids router 6A in ensuring that the state of the corresponding socket on the backup routing engine matches that of the socket of the primary routing engine.

In the event that the primary routing engine of router 6A goes down, for example as a result of a failure or because software of the primary routing engine is to be updated, the secondary routing engine detects the event (e.g., by way of heartbeat signal or explicit message from the primary) and resumes control of all routing functions. Because the secondary routing engine has received all data that the primary routing engine has sent and received, the secondary routing engine may be able to continue the communication session without the necessity of a session restart. This data includes socket data replication (e.g., replication of inbound and outbound data) between different routing engines.

For example, the secondary routing engine may keep track of sequence numbers of received packets and received acknowledgements for the corresponding socket. The secondary routing engine may also buffer sent data such that, if the primary routing engine fails at a time when sent data is not received by a peer recipient (as determined by whether the secondary routing engine as received an acknowledgement), the secondary routing engine may retransmit the data after taking control of routing duties.

Furthermore, according to the techniques of this disclosure, the primary routing engine may be configured to replicate state information (e.g., socket data) to the secondary routing engine without relying on kernel-level enhancements, thus enabling graceful failover including socket data replication without requiring modification to an underlying kernel of an operating system of the primary routing engine. That is, the primary routing engine may be configured with a user-space replication application that intercepts socket calls, a new kernel-level module that operates separate from existing kernel software and is invoked by the replication application for replicating socket data to the secondary routing engine. When the socket layer of the operating system of the primary routing engine receives data from a peer (e.g., router 6B) or an application (e.g., a routing process), the kernel module intercepts the data and replicates this data to the secondary routing engine. After receiving an acknowledgement from the secondary routing engine, the kernel module proceeds to process the data. In general, the kernel module may include three parts: a kernel thread to process data for replication, a device driver (e.g., a Linux or Unix character driver or the like) to intercept socket data from an application (e.g., the routing process), and functionality for socket receive data event interception and event processing.

The techniques described herein may provide certain advantages. For example, router 6A may be able to perform graceful switchover between routing engines, thereby achieving non-stop routing. In the event of a failure or other need to bring down the primary routing engine, router 6A may be able to continue to forward packets without downtime and in a manner that avoid routing session reestablishment, thus avoiding route flapping by peer routers. Similarly, these techniques may enable a router to receive in-service software upgrades without causing route flapping. For example, when a software upgrade is necessary for the router, a system administrator may take the secondary routing engine offline to receive and install the upgrade.

Moreover, router 6A may perform socket replication transparently to outside network devices, such as routers 6B-6C, because no modification to existing communication protocols is necessary. Routers 6B-6C need not change their behavior with respect to the routing protocols used when communicating with peer network devices in order for router 6A to implement socket replication and non-stop routing.

Moreover, routers 6B-6C need not have any indication of the fact that router 6A is configured to perform switchover. Additionally, the techniques described herein may be applied between a routing engine of router 6A and a routing engine of a second router, such as router 6B. That is, a routing engine of router 6A may act as a primary routing engine, while a routing engine of a second router may act as a secondary or back-up routing engine.

Figure 2:
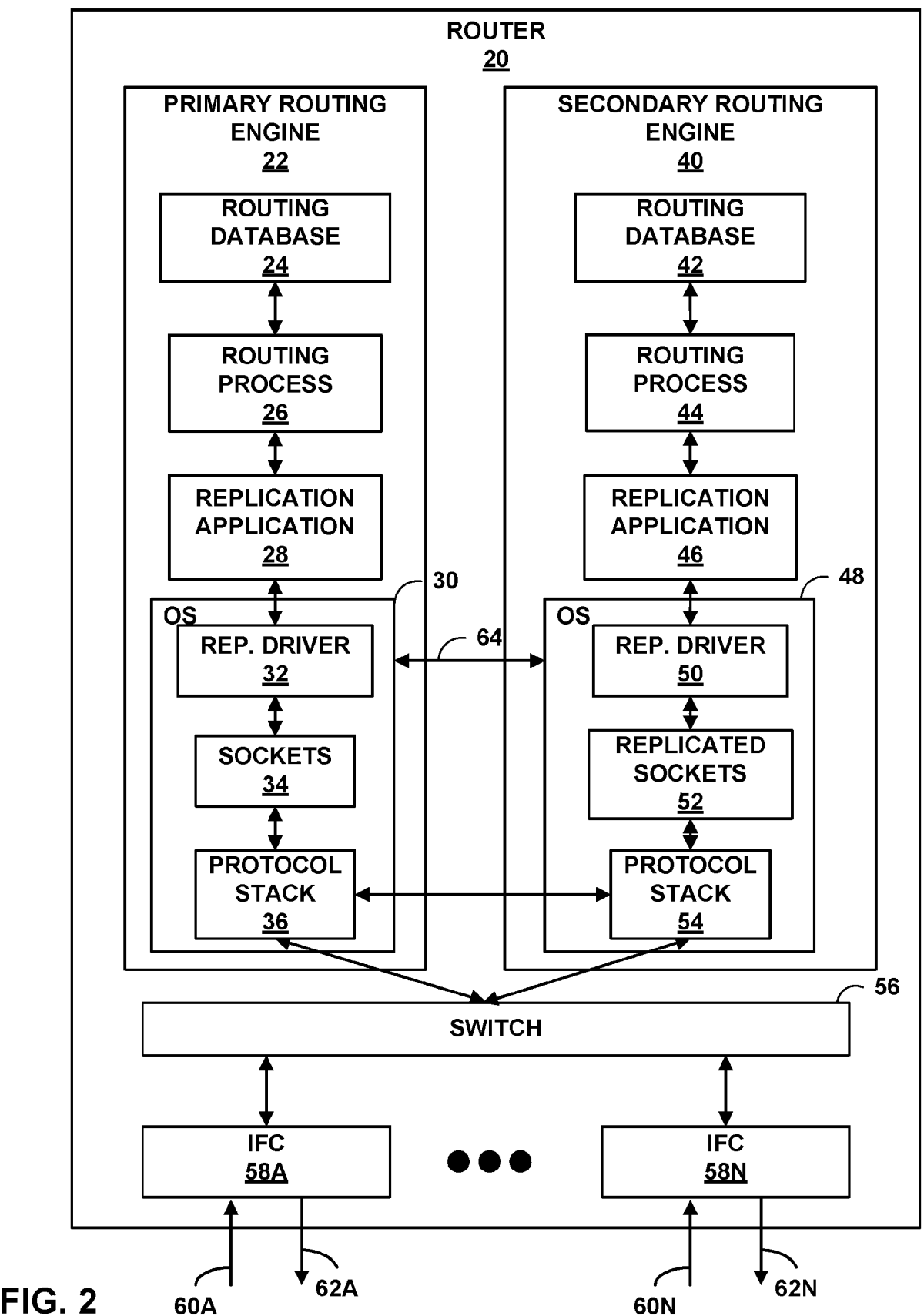
FIG. 2 is a block diagram illustrating an example router capable of performing a graceful switchover from a primary routing engine to a secondary routing engine using the techniques of this disclosure.

FIG. 2 is a block diagram illustrating an example router 20 capable of performing a graceful switchover from primary routing engine 22 to a secondary routing engine 40 using the techniques described herein. Router 20 may, for example, correspond to router 6A of FIG. 1.

In the example embodiment of FIG. 2, router 20 includes primary routing engine 22 and secondary routing engine 40. In this manner, router 20 may be viewed as having a primary control unit and a backup control unit. Primary routing engine 22 is responsible for maintaining routing database 24 to reflect the current topology of a network and other network entities to which router 20 is connected. That is, primary routing engine 22 provides an operating environment for execution of a routing process (daemon) 26 that implements one or more routing protocols to communicate with peer routers and periodically update routing database 24 to accurately reflect the topology of the network and the other network entities. Example protocols include routing and label switching protocols, such as BGP, mpBGP, IS-IS, OSPF, RIP, RSVP-TE and LDP. In a similar fashion, secondary routing engine 40 provides an operating environment for maintaining routing database 42 in accordance with data received from primary routing engine 22.

In a typical architecture, router 20 includes interface cards (IFCs) 58A-58N ("IFCs 58") that receive packets on inbound links 60A-60N ("inbound links 60") and sends packets on outbound links 62A-62N ("outbound links 62"). IFCs 58 are coupled to primary routing engine 22 and secondary routing engine 40 by high-speed switch 56. In another embodiment, router 20 may be a multi-chassis router in which multiple routing nodes are physically coupled and configured to operate as a single routing node. One example of a multi-chassis router includes multiple line card chassis (LCCs), which include one or more interface cards (IFCs) for sending and receiving packets, and a central switch control chassis (SCC), which provides top-down management of the LCCs. U.S. Pat. 8,050,559, issued Nov. 1, 2011, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent 8,050,559 are incorporated herein by reference.

One or more routing protocols implemented by routing process 26 establish peer routing sessions with other routers and, by way of these network communication sessions, exchange routing messages. As such, an operating system (OS) 30 executing within primary routing engine 22 implements kernel-level processes for handling data at various layers of the open systems interconnection (OSI) networking model (shown as protocol stack 36). OS 30 provides an API by which routing process 26 creates sockets 34 and establishes, for example, TCP/IP-based communication sessions for sending and receiving routing messages for each socket. Sockets 34 are logical constructs having data structures and state data maintained by OS 30 of primary routing engine 22 and may be viewed as acting as interfaces between routing process 26 and protocol stack 36. OS 30 also provides both a kernel space for execution of OS-related processes, such as replication driver 32 and the kernel itself, and an application space for execution of applications, such as routing process 26. Replication driver 32 may be implemented as a device driver. The kernel space and application space generally correspond to separate regions of memory, e.g., random access memory (RAM), in which applications, modules, and the like are executed, and OS 30 generally prevents applications executed in the application space from accessing memory addresses assigned to the kernel space.

Primary routing engine 22 of router 20 also includes replication application 28. One or more processors implemented in circuitry of router 20 execute replication application 28 to perform packet and data replication between primary routing engine 22 and secondary routing engine 40, in accordance with the techniques of this disclosure. Replication application 28 may, for example, receive data from routing process 26 to be written to one of sockets 34. In accordance with the techniques of this disclosure, replication application 28 passes such data to replication driver 32, executed within the kernel space provided by OS 30, which replicates the data to secondary routing engine 40 before writing the data to the one of sockets 34, as explained in greater detail below. In particular, OS 30 and OS 48 communicate data and acknowledgements via communication channel 64, which may correspond to a channel between sockets of OS 30 and OS 48.

Secondary routing engine 40 provides an operating environment for execution of routing process 44. Like routing process 26, routing process 44 implements one or more routing protocols and periodically updates routing database 42 to accurately reflect the topology of the network and the other network entities. That is, like routing process 26, routing process 44 sends and receives routing messages through replicated sockets 52, where each of the replicated sockets corresponds to one of sockets 34 currently in use for routing communications. Routing process 44 receives replicated routing messages from primary routing engine 22, updates routing database 42, and outputs routing messages as if it were handling all routing functions for router 20. Replicated sockets 52 of secondary routing engine 40 are logical constructs having data structures and state data maintained by OS 48 and act as an interface between routing process 44 and protocol stack 54, also of secondary routing engine 40. Like OS 30, OS 48 also provides a kernel space and an application space. One or more processors implemented in circuitry of router 20 may execute routing process 44 and replication application 46 in the application space provided by OS 48, and replication driver 50 in the kernel space provided by OS 48.

After opening a new routing session, routing process 26 interacts with operating system 30 to allocate a new socket of sockets 34 for the new routing session, and tags the socket (referred to as the "original socket") for replication by an API call to operating system 30. The call causes operating system 30 to asynchronously set up the replication communications between protocol stacks 36, 54 as described below.

In accordance with the techniques of this disclosure, when routing process 26 performs a write operation to send data to one of sockets 34, replication application 28 receives the data prior to the data reaching the one of sockets 34. Replication application 28 may then construct a write message including the data to send to replication driver 32. For example, replication application 28 may construct a message in the form of an io_buffer data structure as discussed in greater detail below with respect to FIG. 3. In general, this message may indicate that the data is to be written, and include the data to be written itself (or a pointer to a memory location at which the data is stored). Replication application 28 may then pass this message to replication driver 32.

In response to receiving this message, replication driver 32 may cause OS 30 to send data of the message (e.g., the data intended for one of sockets 34) to OS 48 for replication. Ultimately, replication driver 50 of OS 48 may receive the data and update one of replicated sockets 52 corresponding to the one of sockets 34 with this received data. In this manner, the one of replicated sockets 52 will reflect the state of the corresponding one of sockets 34. After updating the one of replicated sockets 52 with the data, replication driver 50 and/or OS 48 may send an acknowledgement of the data to OS 30 and/or replication driver 32.

In response to the acknowledgement, replication driver 32 and/or OS 30 may direct the data to the one of sockets 34. OS 30 may ultimately deliver the data from the one of sockets 34 to protocol stack 36, which encapsulates the data according to the OSI model to form a packet. OS 30 then sends the packet to switch 56, which directs the packet to an appropriate one of IFCs 58 to be sent via one of outbound links 62.

Router 20 may also receive a packet via one of inbound links 60. The one of IFCs 58 that receives the packet may send the packet to switch 56, which may direct the packet to protocol stack 36 of primary routing engine 22, assuming primary routing engine 22 is still active as the primary node. Protocol stack 36 may decapsulate the packet to extract application-layer data associated with an application, such as a routing instance of routing process 26. In accordance with the techniques of this disclosure, OS 30 may maintain a data structure (not shown) representative of applications for which data is to be replicated. Accordingly, OS 30 may determine whether the application-layer data is to be replicated to secondary routing engine 40 based on the application to which the application-layer data is to be delivered and the data structure.

If the application-layer data is to be replicated, OS 30 may deliver the application-layer data to replication driver 32. Replication driver 32 may again form a data structure including and/or representative of the application-layer data and send this data structure (e.g., the io_buffer data structure discussed in greater detail below) to OS 48. After OS 48 and/or replication driver 50 updates a corresponding one of replicated sockets 52, OS 48 may send an acknowledgement of the replicated data to OS 30.

OS 30 may receive a read request from routing process 26 to read data from the one of sockets 34 to which the received application-layer data is to be written. Replication driver 32 and/or OS 30 may wait until after the acknowledgement is received from OS 48/replication driver 50 before delivering data of the one of sockets 34 to routing process 26 in response to the read request.

In this manner, router 20 may perform a socket replication process between sockets 34 and replicated sockets 52 of primary routing engine 22 and secondary routing engine 40, respectively. In particular, this socket replication process does not need to involve alteration of a kernel of OS 30 or a kernel of OS 48. Thus, the techniques of this disclosure may be implemented in a router for which OSs 30, 48 are closed source or for which licensures prevent kernel alteration. That is, because the techniques of this disclosure can be performed, at least in part, by replication drivers 32, 50 (implemented as device drivers in this example), replication drivers 32, 50 have access to kernel-level resources, without modifying the kernel itself.

Figure 3:
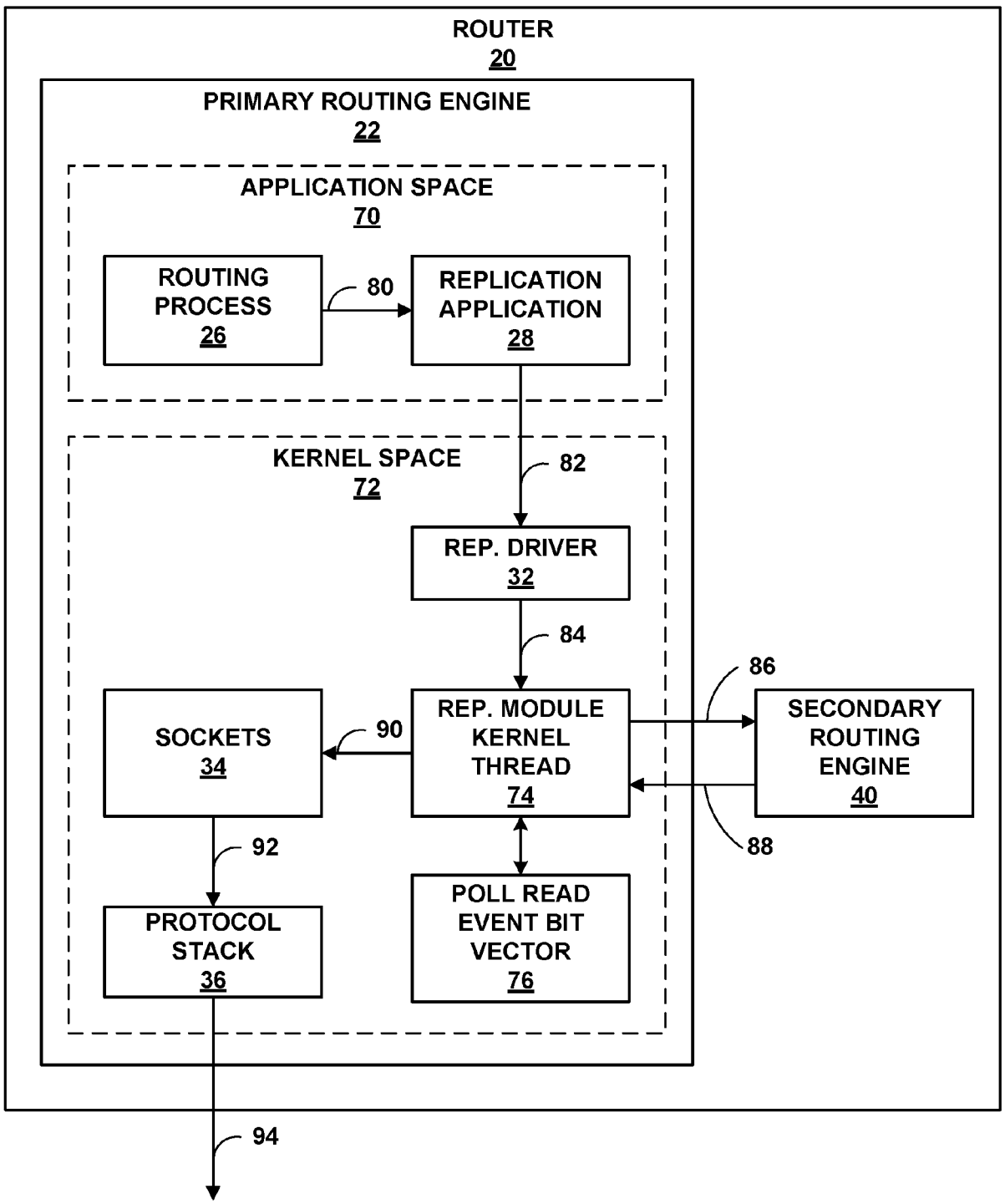
FIG. 3 is a flow diagram illustrating an example process for performing outbound data replication according to the techniques of this disclosure.

FIG. 3 is a flow diagram illustrating an example process for performing outbound data replication according to the techniques of this disclosure. In particular, FIG. 3 depicts an example set of components of router 20 of FIG. 2 in greater detail. In this example, primary routing engine 22 includes application space 70 and kernel space 72, provided by OS 30 of FIG. 2 (not shown in FIG. 3). One or more processors of router 20 execute routing process 26 and replication application 28 in application space 70, and replication driver 32, replication module kernel thread 74, sockets 34, protocol stack 36, and poll read event bit vector 76 in kernel space 72. Routing process 26 represents one example of a master application that may write data to one of sockets 34, which may be replicated according to the techniques of this disclosure. Replication driver 32 and replication module kernel thread 74 may be functionally integrated as a single module or driver in some examples, but are illustrated and discussed separately for purposes of explanation.

In the process of FIG. 3, routing process 26 initially calls a function that is configured to write data to the socket using socket interfaces. However, according to the techniques of this disclosure, replication application 28 is part of a replication library of router 20. In particular, replication application 28 is configured to receive a socket write call from applications, such as routing process 26 of FIG. 3. Thus, the socket write system call (syscall) from routing process 26 is overridden, and the written data is sent to replication application 28 (80).

Replication application 28 constructs a write message and calls its own replication write function, which passes the write message to replication driver 32 (82). The write message may be in the form of a data structure, e.g., as shown below:

```
struct io_buffer {
    int io_flags; /* operation flags rd/wr */
    int io_fd; /* socket descriptor for I/O after replication is performed */
    char* io_buffer; /* socket data */
};
```

The io_flags element of the io_buffer data structure may have one of the following values:

IO_FD: socket file descriptor (FD) for read/write
IO_REPL_FD: REPLICATION FD to replicate data to the backup(only once)
IO_RD : socket READ OP
IO_WR : socket WRITE OP
IO_MORE : set by replication module to indicate to application that there is more data to be read.

The io_fd element of the io_buffer data structure represents a socket descriptor for one or more input/output (I/O) operations.

The io_buffer element of the io_buffer data structure is a buffer having a value that points to data for read/write operations. For the IO_REPL_FD operation, the value of the buffer points to the replication FD.

In this manner, replication application 28 writes the struct io_buffer data structure to replication driver 32. Replication application 28 may mark one or more of sockets 34 that should be interpreted as replicated by the kernel replication driver (e.g., /dev/repl) to replicate the data to secondary routing engine 40 or to append the data to the socket send buffer directly and trigger layer 4 processing of the data. In particular, replication driver 32 and/or replication module kernel thread 74 may maintain data associated with poll read event bit vector 76 representing which of sockets 34 are to be replicated to secondary routing engine 40. In this manner, as explained in greater detail below with respect to FIG. 4, when data for one of sockets 34 is received that is to be replicated, replication driver 32 and/or replication module kernel thread 74 may determine not to return this data to routing process 26 until after the data has been replicated to secondary routing engine 40, using poll read event bit vector 76.

Replication driver 32 then passes the data to replication module kernel thread 74 (84), which writes this data over a replication channel (e.g., a socket, represented by communication channel 64 of FIG. 2) to secondary routing engine 40 (86), which executes a similar replication kernel thread (not shown in FIG. 3). Replication driver 32 appends enough header information to this data for secondary routing engine 40 to identify the connection to which the data corresponds. The data could then be delivered to the application in anyway. After the replication module kernel thread on secondary routing engine 40 has received this data, secondary routing engine 40 acknowledges the data to primary routing engine 22 (88).

After the acknowledgement, replication module kernel thread 74 on primary routing engine 22 appends the replicated socket data to the socket of sockets 34 for which the data was intended (pointed to by io_fd field of the object io_buffer received by replication driver 32) (90). Protocol stack 36 then receives the socket buffer data from the socket of sockets 34 (92) and processes the data accordingly to be sent via corresponding network protocols (94).

Replication module kernel thread 74 may replicate data to secondary routing engine 40 via any inter-process communication (IPC) mechanism, such as TCP sockets. The data may be multiplexed based on the header attached with the socket data and delivered to the respective handle.

Inbound data replication may be performed in a similar manner. In one example, incoming data is received in the socket's receive buffer and then the socket wakeup mechanism is slightly modified, so that for the replicated sockets of sockets 34, replication module kernel thread 74 is woken up instead of the real application that owns the socket (routing process 26, in this example). Different operating systems implement different wakeup call back mechanism for each socket type whenever data is received on the socket. This callback mechanism on the event "data-received" could be applied on any operating system. The example of replication module kernel thread 74 of this disclosure is configured to override this callback mechanism to wake up after reception of socket data.

Figure 4:
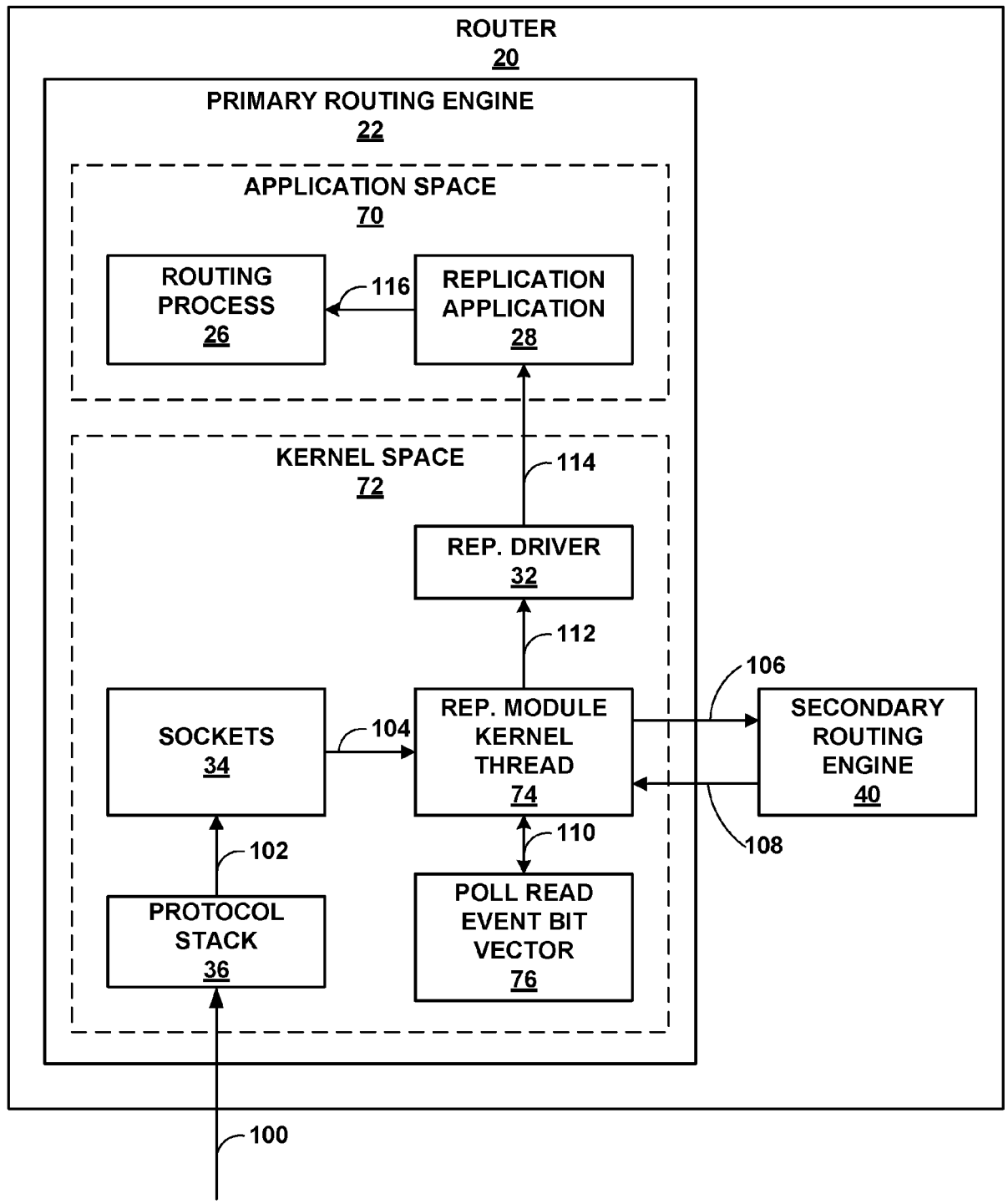
FIG. 4 is a flow diagram illustrating a bit-vector poll operation for a read event according to the techniques of this disclosure.

FIG. 4 is a flow diagram illustrating a bit-vector poll operation for a read event according to the techniques of this disclosure. FIG. 4 shows a per-process poll read event bit vector 76 of replicated socket FDs being polled by replication application 28. A poll/select module implementation maintains poll read event bit vector 76 of all of sockets 34 being polled for different events, such as read/write/exceptions. Replication module kernel thread 74 may ensure that any data received (100) on one of sockets 34 that is to be replicated should not be read by routing process 26 (and replication application 28) unless the data is replicated successfully to secondary routing engine 40. To achieve this, initially, received data is written to the appropriate one of sockets 34 (102), and replication module kernel thread 74 is woken up in response to data being received by protocol stack 36 (104). Replication module kernel thread 74 then sends the data to secondary routing engine 40 (106), which acknowledges the data after receipt (108).

Replication module kernel thread 74 may set the bit field in poll read event bit vector 76 for the replicated socket's read event bit-vector which have already replicated data (110). These bit-fields in poll read event bit vector 76 are set only when the received data is successfully replicated to secondary routing engine 40. Routing process 26 and/or replication application 28 is woken up after this to read the data, causing replication module kernel thread 74 to deliver the received data to replication driver 32 (112), which sends the data to replication application 28 (114), which delivers the data to routing process 26 (116).

For protocols like TCP that need an acknowledgement (ACK) mechanism, replication module kernel thread 74 may ensure that TCP ACK's will be sent out via protocol stack 36 only after data has been successfully replicated to secondary routing engine 40. The ACK's generated by the TCP stack would be held at a netfilter hook (not shown) without kernel modifications. After replication module kernel thread 74 receives an ACK for the given data chunk from secondary routing engine 40 (108), replication module kernel thread 74 identifies the one of sockets 34 for the data and signals the NF hook module to release the TCP ACK for the data chunk. Replication module kernel thread 74 may also include a mechanism to periodically update primary routing engine 22 about the buffer size available on secondary routing engine 40 for each replicated socket of sockets 34. This mechanism may be used for protocols like TCP to communicate window size (taking into account buffer size available on secondary routing engine 40's replicated socket) in the TCP headers to the peer.

Figure 5:
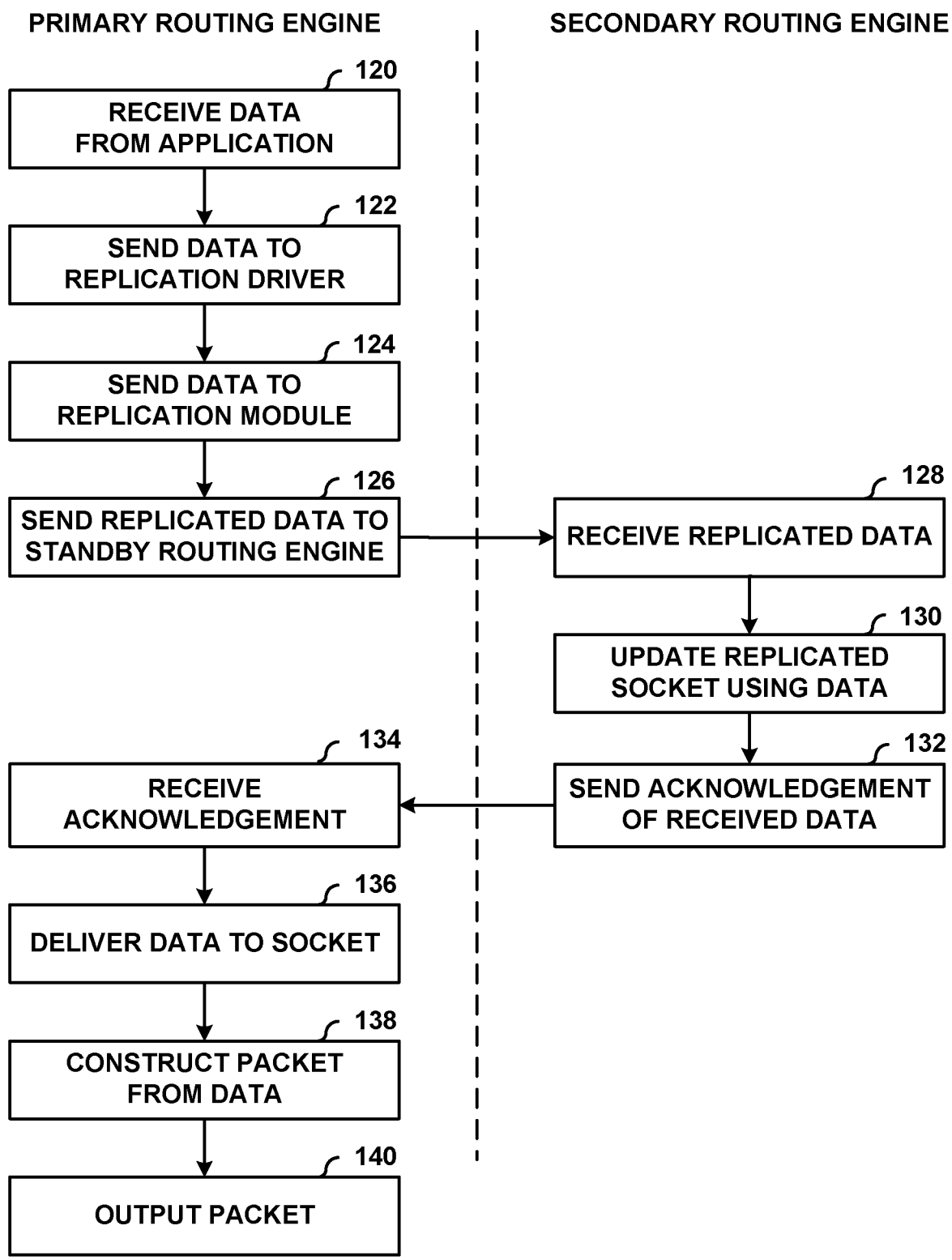
FIG. 5 is a flowchart illustrating an example method for replicating data received from a local application to be written to a socket from a primary routine engine to a secondary routing engine according to the techniques of this disclosure.

FIG. 5 is a flowchart illustrating an example method for replicating outbound data received from a local application to be written to a socket for communication from primary routine engine 22 to a peer network device. As shown, the outbound data is replicated to secondary routing engine 40 according to the techniques of this disclosure. Initially, replication application 28 executing within a user space of primary routing engine 40 receives data from an application (e.g., routing process 26) to be written to one of sockets 34 for outbound communication to a peer network device (120). The one of sockets 34 is designated as a socket for which data is to be replicated, in this example, to support graceful failover in the event of failure of the primary routing engine. Thus, as discussed above, replication application 28 delivers the data to replication driver 32 (122), which sends the data to replication module kernel thread 74 of FIG. 3 (124).

Replication module kernel thread 74 sends a representation of the data to secondary routing engine 40 (126). For example, replication module kernel thread 74 may instantiate a message according to the io_buffer data structure discussed above. Replication module kernel thread 74 may then send this message to secondary routing engine 40.

Secondary routing engine 40 receives the message from primary routing engine 22 (128). Secondary routing engine 40 (in particular, a replication module kernel thread similar to replication module kernel thread 74 of primary routing engine 22) updates the socket corresponding to the received data using the received data (130). Secondary routing engine 40 then sends an acknowledgement of the received data (132). In this manner, if primary routing engine 22 fails over to secondary routing engine 40, secondary routing engine 40 can operate on behalf of primary routing engine 22, to prevent disruption of established network communications.

Primary routing engine 22 receives the acknowledgement from secondary routing engine 40 (134). Replication module kernel thread 74 then delivers the data received from replication driver 32 to the one of sockets 34 (136). This causes protocol stack 36 to construct a packet from the data of the one of sockets 34 (138), e.g., encapsulating the application-layer data with various network layer headers. Ultimately, one of IFCs 58 outputs the packet (140).

Figure 6:
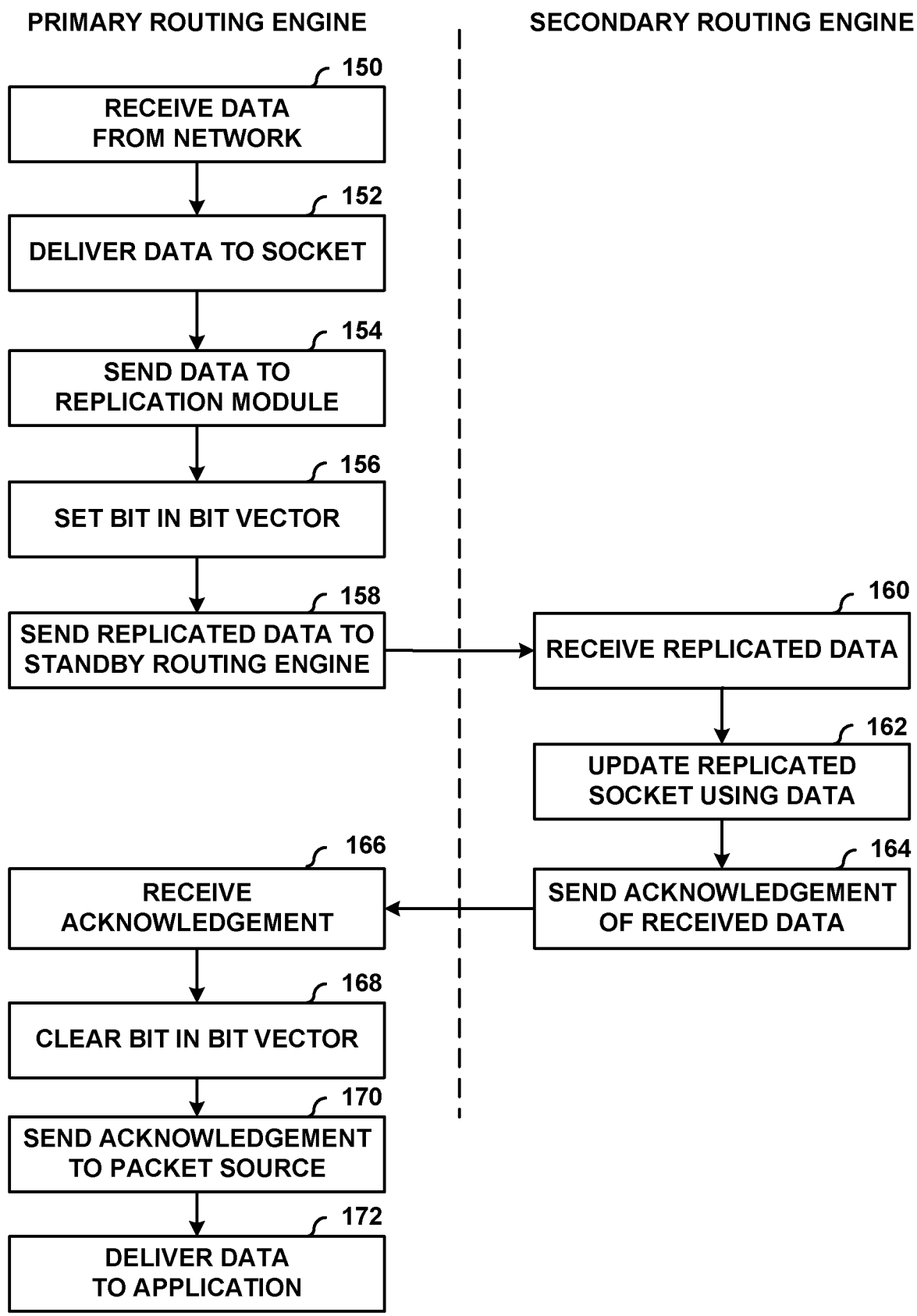
FIG. 6 is a flowchart illustrating an example method for replicating inbound data received from a peer network device via a socket associated with primary routine engine 22.

FIG. 6 is a flowchart illustrating an example method for replicating inbound data received from a peer network device via a socket associated with primary routine engine 22. As described, the inbound data is replicated to secondary routing engine 40 according to the techniques of this disclosure. Initially, primary routing engine 22 receives data from the network via protocol stack 36 (150). That is, protocol stack 36 receives a packet and decapsulates the packet to extract application-layer data. Ultimately, protocol stack 36 delivers this data to one of sockets 34 (152), which prompts a wake-up of replication module kernel thread 74.

Replication module kernel thread 74 then receives the data (154) and sets a bit in poll read event bit vector 76 (156) to prevent routing process 26 from reading the data at this point. Replication module kernel thread 74 then sends replicated data (e.g., a message constructed according to the io_buffer data structure discussed above) to secondary routing engine 40 (158).

Secondary routing engine 40 receives the replicated data (160). As discussed above, secondary routing engine 40 updates a replicated socket using the data (162). After updating the replicated socket, secondary routing engine 40 sends an acknowledgement of the received data to primary routing engine 22 (164).

Primary routing engine 22 then receives the acknowledgement (166) and clears the bit in the bit vector (168) corresponding to the socket. Replication module kernel thread 74 also sends an acknowledgement of the packet to a source of the packet after receiving the acknowledgement from secondary routing engine 40 (170). Clearing the bit in the bit vector allows a read request from routing process 26, which polls the corresponding socket of sockets 34, to request the data from the corresponding socket to be satisfied. Thus, replication module kernel thread 74 delivers the data to replication driver 32, which delivers the data to replication application 28, which ultimately delivers the data to routing process 26 (172). Although not shown in the example method of FIG. 6, replication module kernel thread 74 may also cause protocol stack 36 to send an acknowledgement of receipt of the data to a device from which the data was received (e.g., another router) in response to receiving the acknowledgement from secondary routing engine 40.

In this manner, the techniques of this disclosure may address various issues related to socket data replication for, e.g., high availability. The techniques of this disclosure may be used in conjunction with open source operating system software, such as Linux, whose licensing terms prohibit modification of the operating system kernel. Because the kernel need not be modified, kernel versions can be upgraded periodically and relatively simply. The techniques of this disclosure may be applied when an operating system kernel is only available as a binary and not open source as well, because the kernel need not be modified and recompiled, since the techniques of this disclosure can be implemented using loadable modules. The techniques of this disclosure may allow applications to work with socket data replication without almost any change other than marking a socket to be replicated. These techniques may provide overall performance benefits in terms of reduced memory copy and number of system calls made, which would otherwise heavily impact the system in a scaled environment.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
receiving, by a replication application executed in application space provided by an operating system of a primary node of a network device, a write function call including data to be written to a socket of the operating system, wherein the socket provides network communication connectivity between the primary node of the network device and a peer network device;
sending, by the replication application executing in the application space, a representation of the data to a replication module executed in a kernel space provided by the operating system;
sending, by the replication module, the representation of the data to a standby node of the network device, wherein the standby node is configured to provide control for the network device after failure of the primary node; and
after receiving an acknowledgement from the standby node, sending, by the replication module, the data to the peer network device via the socket.

2. The method of claim 1, wherein the operating system comprises a closed source operating system.

3. The method of claim 1, wherein the replication module comprises a replication driver separate from a kernel of the operating system, and wherein the kernel provides the kernel space for execution of modules and device drivers including the replication driver.

4. The method of claim 1, wherein sending the representation of the data to the standby node comprises sending, by the replication module, the representation of the data to a replication driver comprising a device driver, and sending, by the replication driver, the representation of the data to the standby node.

5. The method of claim 1, further comprising forming the representation of the data, wherein forming the representation of the data comprises:
generating one or more operation flags as part of the representation of the data;
generating a socket descriptor as part of the representation of the data; and
generating buffer data identifying the data as part of the representation of the data.

6. The method of claim 5, wherein generating the one or more operation flags comprises setting a value of at least one of the operation flags to indicate that an operation for the data comprises one of a socket file descriptor for a read or write operation, a replication file descriptor for replicating data to the standby node, a read operation, a write operation, or a more operation indicating that more data is to be read.

7. The method of claim 1, wherein sending the representation of the data to the standby node comprises sending the representation of the data to the standby node according to transmission control protocol (TCP), the method further comprising receiving the acknowledgement from the standby node according to TCP.

8. The method of claim 1, further comprising forming, by the operating system, a packet including the data sent to the socket.

9. The method of claim 1, further comprising:
retrieving, by the replication module, second data of a received packet from the socket;
sending, by the replication module, the second data to the standby node; and
after receiving a second acknowledgement from the standby node, sending, by the replication module, the second data to the replication application.

10. The method of claim 9, wherein sending the second data to the standby node comprises:
determining that a bit vector including a plurality of bits, the bits corresponding to respective sockets of a plurality of sockets including the socket, includes a bit corresponding to the socket having a value indicating that data received by the socket is to be replicated to the standby node; and
in response to determining that the bit vector includes the bit having the value indicating that data is to be replicated to the standby node, sending the second data to the standby node.

11. The method of claim 9, further comprising, after receiving the second acknowledgement, sending, by the replication module, a third acknowledgement of the received packet to a source of the received packet.

12. A network device comprising:
a primary node; and
a standby node configured to provide control for the network device after failure of the primary node,
wherein primary node comprises one or more processors implemented in circuitry and configured to:
execute an operating system to provide an application space and a kernel space;
execute a replication application in the application space to receive a write function call including data to be written to a socket of the operating system and to send a representation of the data to a replication module executed in the kernel space, wherein the socket provides network communication connectivity between the primary node of the network device and a peer network device;
execute the replication module to send the representation of the data to the standby node and, after receiving an acknowledgement from the standby node, to send the data to the peer network device via the socket.

13. The network device of claim 12, wherein the operating system comprises a closed source operating system.

14. The network device of claim 12, wherein the replication module comprises a replication driver separate from a kernel of the operating system, and wherein the kernel provides the kernel space for execution of modules and device drivers including the replication driver.

15. The network device of claim 12, wherein the one or more processors are configured to execute the replication module to send the representation of the data to a replication driver comprising a device driver, and to execute the replication driver to send the representation of the data to the standby node.

16. The network device of claim 12, wherein the one or more processors are further configured to form the representation of the data, wherein to form the representation of the data, the one or more processors are configured to:
generate one or more operation flags as part of the representation of the data;
generate a socket descriptor as part of the representation of the data; and
generate buffer data identifying the data as part of the representation of the data.

17. The network device of claim 16, wherein to generate the one or more operation flags, the one or more processors are configured to set a value of at least one of the operation flags to indicate that an operation for the data comprises one of a socket file descriptor for a read or write operation, a replication file descriptor for replicating data to the standby node, a read operation, a write operation, or a more operation indicating that more data is to be read.

18. The network device of claim 12, wherein the one or more processors are configured to send the representation of the data to the standby node according to transmission control protocol (TCP) and to receive the acknowledgement from the standby node according to TCP.

19. The network device of claim 12, wherein the one or more processors are further configured to execute the operating system to form a packet including the data sent to the socket.

20. The network device of claim 12, wherein the one or more processors are further configured to execute the replication module to retrieve second data of a received packet from the socket, send the second data to the standby node, and after receiving a second acknowledgement from the standby node, send the second data to the replication application.

21. The network device of claim 20, wherein the one or more processors are further configured to execute the replication module to determine that a bit vector including a plurality of bits, the bits corresponding to respective sockets of a plurality of sockets including the socket, includes a bit corresponding to the socket having a value indicating that data received by the socket is to be replicated to the standby node, and in response to determining that the bit vector includes the bit having the value indicating that data is to be replicated to the standby node, send the second data to the standby node.

22. The network device of claim 20, wherein the one or more processors are further configured to, after receiving the second acknowledgement, execute the replication module to send a third acknowledgement of the received packet to a source of the received packet.

23. A computer-readable storage medium having stored thereon instructions that, when executed, cause one or more processors of a primary node of a network device to:
- execute an operating system to provide an application space and a kernel space;
- execute a replication application in the application space to receive a write function call including data to be written to a socket of the operating system and to send a representation of the data to a replication module executed in the kernel space; and
- execute the replication module to send the representation of the data to a standby node of the network device and, after receiving an acknowledgement from the standby node, to send the data to the socket.

* * * * *